ling Office 3,605,699
Patented Sept. 20, 1971

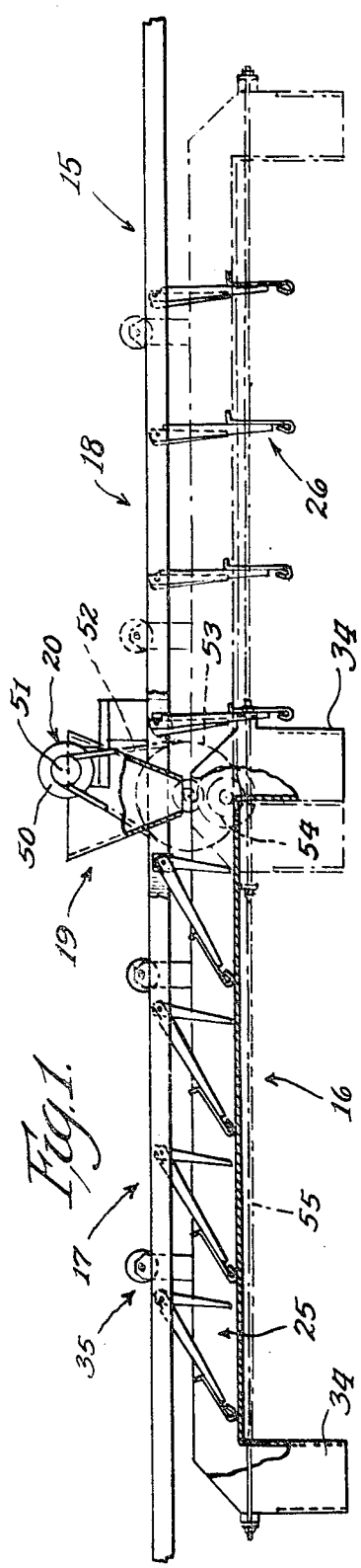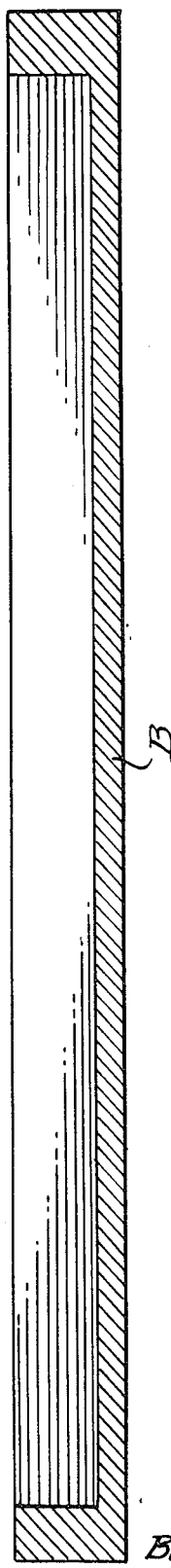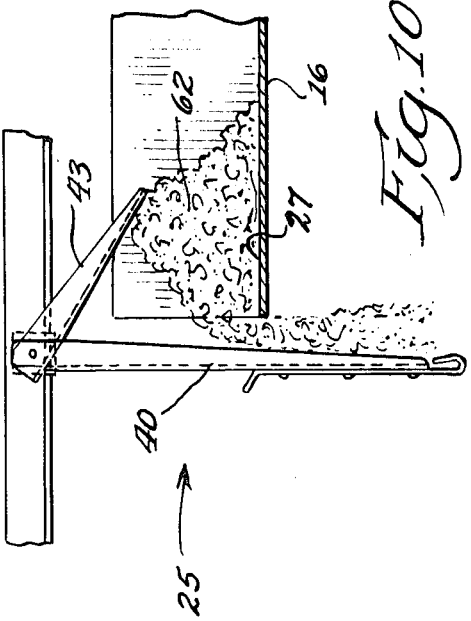

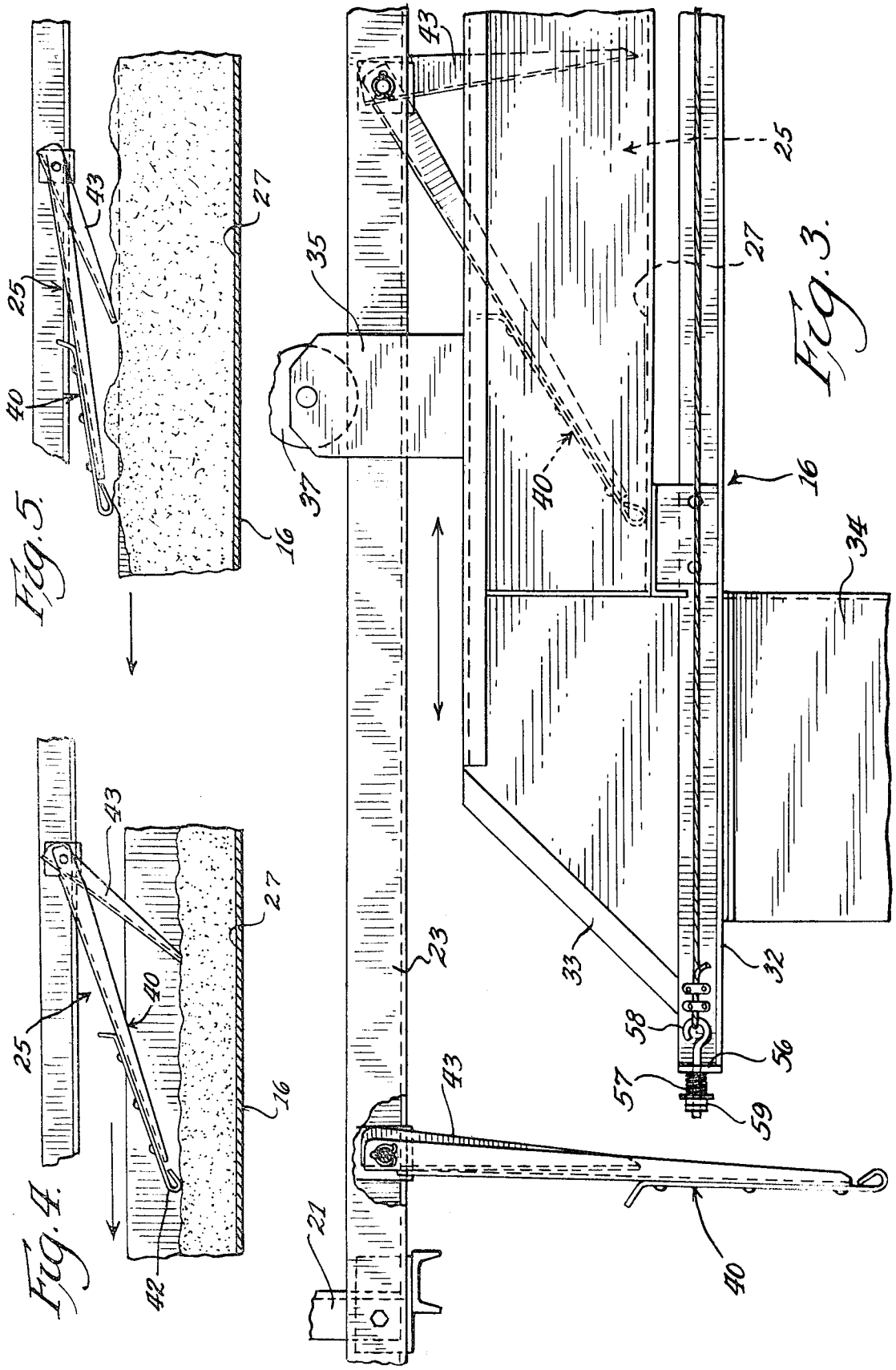

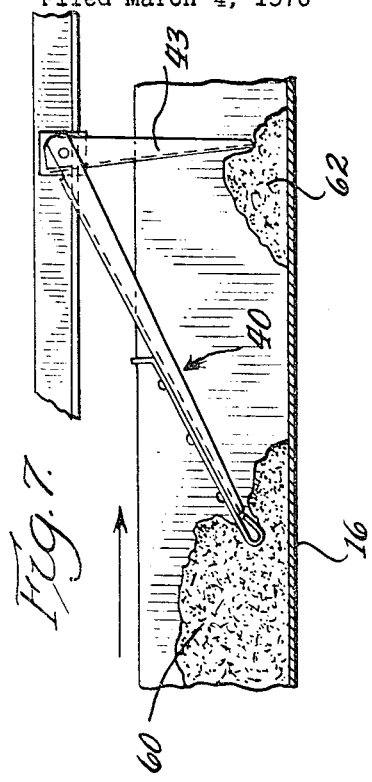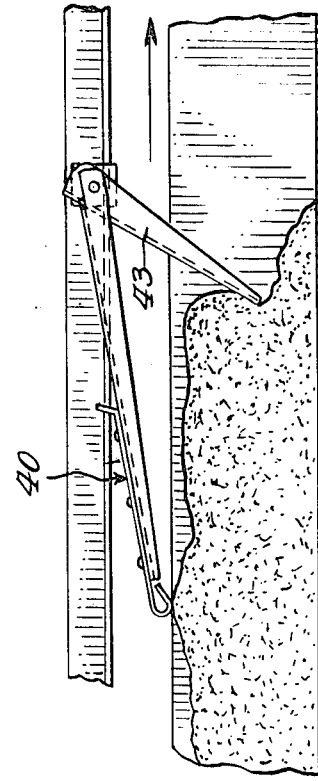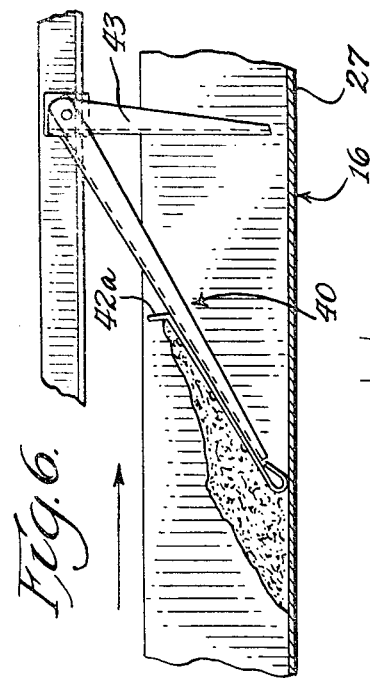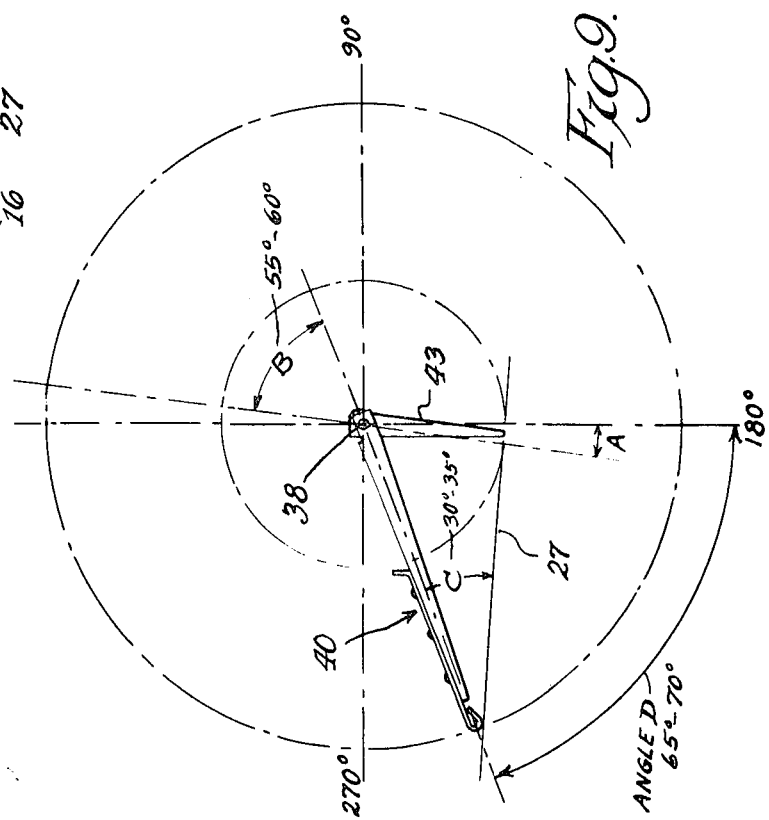

3,605,699
SWEEP SHUTTLE FEEDER
Robert G. Ferris, Harvard, and Allen K. Gillette,
Belvidere, Ill., assignors to Starline, Inc.
Filed Mar. 4, 1970, Ser. No. 16,436
Int. Cl. A01k 5/00; B65g 25/04
U.S. Cl. 119—56R                                        10 Claims

ABSTRACT OF THE DISCLOSURE

A sweep shuttle animal feeder of the type having a feed trough which reciprocates above a feed bunk that is about twice the length of the trough so that feed deposited in the reciprocating trough from a feed supply station above the mid point of the bunk may be dropped from the trough along the bunk by the action of two sets of sweep means that are pivoted above the path of travel of the trough with a set on each side of the feed supply station to selectively control relative movement between the deposited feed and the trough. The sweep means of the set through which the leading end of the trough is passing at any given time pass over the feed in the trough, while the sweep means of the set through which the trailing end of the trough is passing at any given time arrest the feed in the trough so that it drops off the trailing end. Each of the sweep means in each set includes a solid sweep panel pivotally mounted and engageable with the bottom of the trough for arresting the movement of free flowing granular material and also including sweep tines pivotally mounted about the same axis as the sweep panel for arresting the movement of dense material which the panel may not penetrate, both the sweep panels and the sweep tines being permitted free movement through a vertical plane when the trough is not under the sweep means to minimize material squeezing between the sweep panel and the sweep tines. There being further provided an interconnection between the sweep tines and the sweep panel to limit the maximum annular movement therebetween so that when the sweep panel rides in the trough on either the trough floor or feed thereon, the sweep tines are prevented from rotating through a vertical plane and are maintained in an operative sweeping position.

BACKGROUND OF THE PRESENT INVENTION

The present invention relates to sweep shuttle feeders of the type disclosed in the Ferris et al. application, Ser. No. 829,933 filed June 3, 1969, now U.S. Pat. No. 3,561,404 assigned to the assignee of the present invention. In the Ferris et al. application a shuttle feeder is disclosed that includes a plurality of sets of sweep means on each side of a central feeder station with each of the sweep means including a pivotally mounted solid panel sweep for engaging the bottom of the trough and sweeping out granular material and a pair of tines mounted on the same axis, but shorter than the panel sweep for arresting the denser feed materials and assisting their discharge from the trough. The sweep panels and the sweep tines, as disclosed in the prior application, are permitted independent relative rotation, but neither may pivot to the feed station side of a vertical plane through their pivot axes. One reason for his arrangement is that the tines are shorter in length than the distance between their pivot axes and the floor of the trough so that as the trailing end of the trough passes over the adjacent tines the tines would pass overcenter and become inoperative unless restrained against movement through the aforesaid vertical plane.

While this construction has been found quite satisfactory in use, experience has demonstrated that the denser materials over which the sweep panels ride tend to be caught, squeezed, or pinched between the panel sweeps and the sweep tines, rather than being discharged into the feed bunk.

It is a primary object of the present invention to provide an improved shuttle feeder similar to the one described above but having certain improvements thereover which increase the efficiency of discharge of the feeder.

SUMMARY OF THE PRESENT INVENTION

In accordance with the present invention a sweep shuttle animal feeder is provided of the type having a plurality of sets of sweep means with each of the sweep means including a solid panel sweep and a pair of relatively rotatable sweep tines which cooperate in a manner to improve discharge of different types of materials from the trough. The solid panel sweep is of sufficient length so it engages the bottom of the trough and assumes an angle of thirty to thirty-five degrees with the bottom of the trough and functions mainly to arrest granular material and cause it to drop from the trailing end of the trough. Each of the panel sweeps is mounted for 360 degrees of pivotal movement about the axis of a supporting shaft. Also supported on each of the sweep shafts is a pair of sweep tines that are, like the sweep panels, permitted 360 degrees pivotal movement about the axis of the sweep support shafts. Thus, both the sweep panels and the sweep tines are permitted free swinging movement through a vertical plane when the sweep panels are not riding in the feed trough.

While both the sweep panels and the sweep tines are permitted free rotation through a vertical plane there is means provided for limiting the relative movement between the sweep panels and the sweep tines to approximately sixty-five to seventy degrees. Thus, the sweep panels are permitted free rotation as a unit and free pivotal movement relative to one another within a sixty-five to seventy degree angle.

As a result of this construction, when the trailing end of the trough is passing under the discharging sweep means set, the panel sweeps may tend to ride over the denser material as in prior constructions. Because of the limited maximum angle between the panel sweeps and the sweep tines, the panel sweeps will tend to raise up the sweep tines initially. However, the sweep tines will then begin digging into the denser haylage, moving more towards a vertical position, and pull the panel sweeps down somewhat into the feed material improving the discharge efficiency of the panel sweep.

A further and fundamental advantage in the present construction is the elimination of pinching hylage or feed material wads between the panel sweeps and the sweep tines as the trailing end of the trough releases each panel sweep and permits it to rotate toward the sweep tines. As the distal end of the sweep panel arrives at the trailing end of the trough, the longer denser feed materials are permitted to stay on the end of the trough between the two sweep devices since the sweep panel tends to ride over this type of material as noted above. When the end of the trough permits the panel sweep to drop to a vertical position as it passes over the trailing end of the trough, the maximum angular connection limitation between the panel sweep and the sweep tines permits the sweep tines to rotate past a vertical plane and pass over the wad of feed material at the end of the trough, effectively releasing the wad, rather than trapping this material between the panel sweep and the sweep tines.

The material wad left on the end of the trough is removed by the outermost sweep means of the set on the next stroke of the trough.

BRIEF DESCRIPTION OF THE DRAWINGS

FIG. 1 is a somewhat schematic side elevational view of a sweep shuttle feeder embodying the invention with parts broken away for clarity of illustration, and with the feed trough illustrated in solid lines at one end of its path of travel and in broken lines at the other (right) end of its path of travel;

FIG. 3 is a fragmentary side elevational view on an enlarged scale showing one end of the feed trough and two of the sweep means of one set of sweep means;

FIG. 4 is a fragmentary elevational view of one sweep means during filling with a moderate load;

FIG. 5 is a fragmentary elevational view of a sweep means during filling with a full trough load;

FIG. 6 is a fragmentary elevational view of a sweep means during trough discharge and arrest of granular material;

FIG. 7 is a fragmentary elevational view of a sweep means with part of the sweep means discharging granular material and part of the sweep means discharging fibrous material;

FIG. 8 is a fragmentary elevational view of a sweep means with part of the sweep means riding over the fibrous material in the trough and part of the sweep means digging into the fibrous material;

FIG. 9 is a subassembly view of one sweep means showing the angular relationship thereof in the present invention;

FIG. 10 is a fragmentary elevation of a sweep means during discharge with one part of the sweep means passing over the trailing end of the trough; and FIG. 10A is a fragmentary elevational view of a sweep means with the trough advanced slightly somewhat from the position shown in FIG. 10 with part of the sweep means riding over the material on the end of the trough.

DETAILED DESCRIPTION OF THE PREFERRED EMBODIMENT

Figure 2:
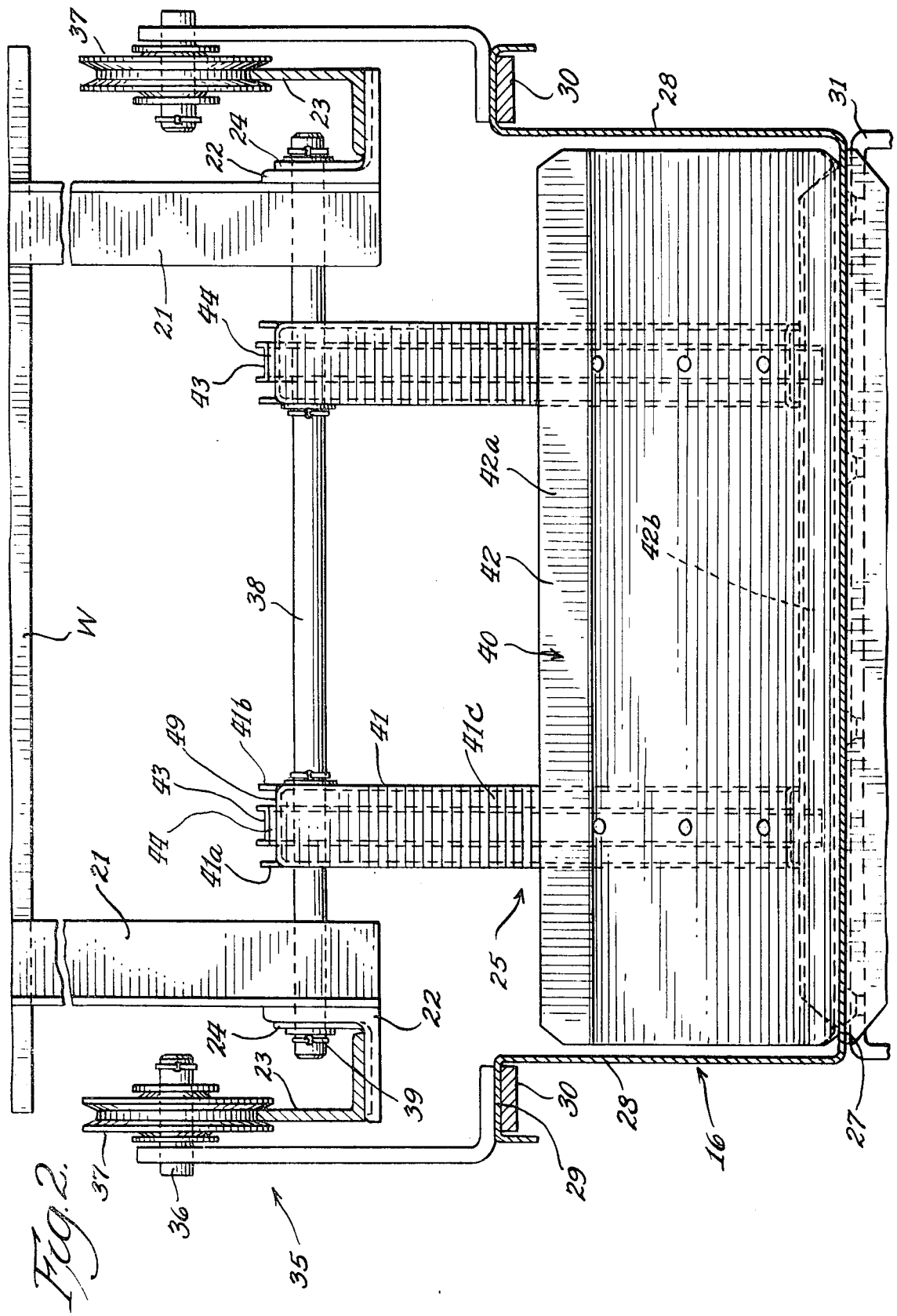
FIG. 2 is a transverse sectional view on an enlarged scale taken substantially as indicated along line 2—2 of FIG. 1.

Referring to the drawings and particularly FIGS. 1 to 3 the present structure is seen to include a feed bunk B; supporting means indicated generally at 15; a feed trough indicated generally at 16 which is mounted for reciprocating movement on the supporting means above the feed bunk; a set of sweep means 17 and a set of sweep means 18 which are on opposite sides of a feed supply station 19; and drive means 20 for reciprocating the feed trough.

The supporting means 15 includes hangers 21 which may be bolted to any supporting structure such as the rafters of a barn, or in the case of an outdoor feed bunk, a separate wooden framework which includes cross members W carried upon any desired supporting members which may be mounted on the sides of the feed bunk or on the ground alongside the feed bunk. As best seen in FIGS. 2 and 3, at the lower ends of the hangers 21 are angle members 22 which support a pair of continuous, parallel rails 23 from which the feed trough 16 is suspended for reciprocating movement. Mounted upon the rails 23 at intervals are brackets 24 which are mounted in pairs with the brackets of a pair being transversely aligned with one another with each pair of brackets serving to support a sweep means, indicated generally at 25, for the sweep means of the left-hand set 17, and 26 for the sweep means of the right-hand set 18.

The feed trough 16 is a sheet metal structure which is generally U-shaped in cross section so that it has a bottom 27 and side walls 28 which terminate at their upper ends in outwardly extending flanges 29 beneath which are longitudinal structural members 30. The trough is preferably made in several sections of convenient lengths which are connected together by splice means 31.

The floor 27 of the trough is open at both ends and longitudinal angle members 32 and inclined members 33 (FIG. 3) cooperate to support feed discharge chutes 34 at the two ends of the trough 16.

Trough mounting brackets 35 are secured to the flanges 29 at intervals and carry inwardly extending pins 36 on which are journalled grooved wheels 37 which ride on the tracks 23 to support the trough 16 for linear reciprocating movement above the feed bunk.

Both of the sweep means 25 and 26 are identical, so only one set of sweep means 25 will be described in detail. As best seen in FIGS. 4 and 5 the sweep means of each of the sets are adapted to swing outwardly with respect to the feed supply station 19 during loading, so that the sweep means 25 pivot in a clockwise direction during loading and the sweep means 26 turn in a counterclockwise direction during loading. Referring to FIGS. 2 to 9, the sweep means 25 each include a transverse shaft 38 which is mounted in the brackets 24, and axially retained by pins 39 as seen in FIG. 2.

Pivotally mounted on the shaft 38 is a sweep panel member indicated generally at 40, which is formed of a pair of channel members 41 each of which has apertured side members 41a and 41b by which it is freely pivotally mounted on shaft 38. Fixed to web portion 41c of the channel members 41 is a sweep panel 42 which is riveted to the channel members 41 and has a rolled lower end 42b.

The sweep panel member 40 has a sufficient length with respect to the axis of shaft 38 so that when the upturned end portion 42b of the sweep panel 42 engages the lower or bottom wall 27 of the trough 16, the panel sweep means 40 will assume approximately a thirty to thirty-five degree angle with respect to the floor of the trough, as indicated at C in FIG. 9.

As noted above the general function of the sweep panel means 40 is to assist in discharging the granular material from the trough 16. To assist in this function the sweep panel 42 has an upwardly turned angle portion 42a as seen clearly in FIGS. 2 and 6 for the purpose of minimizing granular feed spillage over the top of the sweep panel.

Each sweep means 25, 26 also includes sweep tine means consisting of a pair of parallel spaced channel shaped sweep tines 43 pivotally mounted on the shaft 38 between the side members 41a and 41b of channels 41 of the panel sweep. Since both the channel members 41 and the sweep tines 43 are free to rotate on shaft 38 relative motion is permitted between the sweep tines 43 and the panel sweep 40. It should be noted from FIGS. 2 to 8, however, that the sweep tines 43 have an insufficient length to engage the bottom 27 of the feed trough 16 so that means are provided for limiting movement of the sweep tines 43 overcenter, i.e., toward the supply station side of a vertical plane through the shaft 38, when the trough 16 is underneath the tine means.

Toward this end and as viewed clearly in FIG. 2, the web portions of the channel members 41 have end surfaces 49 which define abutments engageable with channel web portions 44 of the sweep tines when said channel members 41 and 43 have a sixty-five to seventy degree relationship with one another as designated by angle D in FIG. 9. Thus, while relative movement is permitted between the sweep panel 40 and the sweep tines 43, the maximum angular relationship between these members is limited to sixty-five to seventy degrees by abutment 49. In both FIGS. 7 and 9 the web 44 of the tines is in engagement with the abutment 50 on the sweep panel channels 41 so that the panel sweep and the sweep tines have their maximum angular relationship.

Thus, with the trough 16 withdrawn from underneath the given sweep means 25, 26 the tine means may rotate a full 360 degrees, as may the panel sweep 40; but the panel sweep 40 is permitted only limited rotation with respect to the tines 43. This relationship is seen more clearly in FIG. 9 where the sweep tines 43 are shown in their gravity position. With the tines 43 in the gravity position shown, the sweep panel member 40 may be rotated clockwise from a vertical position until abutment 49 engages the tines 43. While the panel member 40 may be rotated clockwise further from the position shown in FIG. 9 it may not so rotate without also moving the sweep tines 43. Note that the trough floor 27 is shown angularly related with the horizontal in FIG. 9 since the sweep tines are in fact permitted to move approximately ten degrees through a vertical plane from their gravity position when the sweep panel 40 engages the bottom 27 of the trough. This position is illustrated in FIG. 3, and to a lesser extent in FIG. 7 where the panel 40 is slightly off the floor of the trough 16.

The means 20 for reciprocating the trough includes an electric motor 50 on the shaft of which is a drive pulley 51 (FIG. 1) that receives a drive belt 52 also trained around a large drive pulley 53. Power from the drive pulley 53 goes through a reduction gearing (not shown) at the output end of which is a capstan 54. A drive cable 55 has its opposite ends resiliently connected to brackets 56 (FIG. 3) on the ends of angle members 32, and cable 55 is wrapped about the capstan for three or more turns so that when the capstan is rotated in one direction the cable 55 pulls the feed trough 16 one way, while when the capstan is rotated in the opposite direction it pulls the feed trough the other way. As seen in FIG. 3 the cushioning of the ends of the cable 55 is provided by compression springs 57 which surround the shanks of eyebolts 58 to which the cable ends are connected, with the springs 57 being pressed between the flanges 56 and flanged nuts 59 which are screwed onto the ends of the eyebolts.

Reversing of the drive for the feed trough 16 is accomplished in the conventional manner by limit switches at the two ends of the supporting means 15 which are contacted by switch actuating fingers (not shown) mounted on the ends of the trough 16.

The function of the sweep means 25, 26 and the functional interrelationship of the panel sweep member 40 and the sweep tines 43 will be more clearly apparent from the following brief description of operation. Referring to FIG. 1 and assuming the trough 16 to initially be in its right-hand position, feed through feed station 19 is initiated and drive 20 started shifting the trough 16 to the left. Sweep means 26 then act to discharge feed through the right chute 34 while the left set of sweep means 25 ride over the material in the trough passing thereunder. This is seen in FIGS. 4 and 5, with FIG. 4 illustrating the trough approximately half full and FIG. 5 illustrating the trough completely full but in both instances the trough is moving in what would be termed the loading direction, i.e. the leading end of the trough is passing under the sweep means 25. Note that in each case the material in the trough pivots the respective sweep panel and sweep tines upwardly independently of each other.

After the trough 16 reaches its left extreme position drive 20 reverses the direction of travel of the trough 16. The sweep means 25 then become the discharge elements, and assuming the feed to be granular in character the sweep panel members 40 will arrest the feed without cooperation of the tines 43 and discharge the same through the left chute 34. However, as shown in FIG. 7 the feed material may consist both of granular material indicated generally at 60 and denser haylage indicated at 62. In such a case each panel sweep 40 will tend to ride over the denser haylage 62 permitting the denser material to move toward the tines 43. The tines 43 then arrest the denser fibrous materials and discharge them from the left discharge chute 34.

In cases where there is a substantial amount of haylage or denser materials, as illustrated in FIG. 8, the panel sweeps 40 will have an initial tendency to ride over these materials rather than digging into the same. The tines 43, however, will dig into the haylage as shown and tend to rotate in a counterclockwise direction as shown in FIG. 8. When the tines 43 rotates sufficiently so that maximum angle D is reached, engagement between the tines 43 and abutments 49 will tend to pull the sweep panels 40 down into the haylage forcing the panel sweeps 40 to assist in discharge of the haylage, where they would otherwise ride over the haylage.

When there is haylage between the panel sweep member 40 and the sweep tines 43 as shown in FIG. 10, and the end of the trough 16 passes under the sweep means, the panel sweep member 40 pivots clockwise from its active position permitting the sweep tines 43 to pass freely through a vertical plane to the position shown in FIG. 10A since the maximum angle between the sweep members is not exceeded. As shown in FIG. 10A the sweep tines 43 are permitted to move toward a horizontal position passing over the haylage 62 and permitting the same to remain on the end of the trough 16 rather than being trapped between the sweep members as the sweep panel 40 falls under the influence of gravity. It is, of course, primarily important that the wad is released from between the sweep member, and only secondarily important that the wad be left on the end of the trough. On the following stroke of the trough 16, the wad remaining on the left end of the trough, for example, will be discharged by the leftmost sweep means 25.

We claim:

1. An animal feeder, comprising: support means, a feed trough movably supported on said support means and adapted to receive feed from a source, means for moving said trough between first and second positions, first sweep means pivotally mounted on said support means and positioned to extend within said trough when the trough is in the first position, second sweep means pivotally mounted on said support means and positioned to extend within said trough when the trough is in the second position, said first sweep means being constructed to sweep feed from the trough as the trough moves from the first position toward the second position and the second sweep means being constructed to sweep feed from the trough as the trough means moves from the second position toward the first position, first tine means pivotally mounted adjacent said first sweep means for assisting in feed discharge from the trough, second tine means adjacent said second sweep means for assisting in feed discharge from the trough, and means preventing the relative closure of the sweep means and the adjacent tine means when feed is between the same as each sweep means passes over the end of the trough.

2. An animal feeder, comprising: support means, a feed trough movably supported on said support means and adapted to receive feed from a source, means for moving said trough between first and second positions, first sweep means pivotally mounted on said support means and positioned to extend within said trough when the trough is in the first position, second sweep means pivotally mounted on said support means and positioned to extend within said trough when the trough is in the second position, said first sweep means being constructed to sweep feed from the trough as the trough moves from the first position toward the second position and the second sweep means being constructed to sweep feed from the trough as the trough means moves from the second position toward the first position, first tine means pivotally mounted adjacent said first sweep means for assisting in feed discharge from the trough, second tine means adjacent said second sweep means for assisting in feed discharge from the trough, and means permitting the tine means to pass freely through a vertical plane in the direction of trough movement as the associated sweep means passes over the end of the trough to prevent feed material from being caught therebetween.

3. An animal feeder, comprising: support means, a feed trough movably supported on said support means and adapted to receive feed from a source, means for moving said trough between first and second positions, first sweep means pivotally mounted on said support means and positioned to extend within said trough when the trough is in the first position, second sweep means pivotally mounted on said support means and positioned to extend within said trough when the trough is in the second position, said first sweep means being constructed to sweep feed from the trough as the trough moves from the first position toward the second position and the second sweep means being constructed to sweep feed from the trough as the trough means moves from the second position toward the first position, first tine means pivotally mounted adjacent said first sweep means for assisting in feed discharge from the trough, second tine means adjacent said second sweep means for assisting in feed discharge from the trough, means normally confining said tine means to pivotal movement only in one direction from a substantially vertical plane when the trough is thereunder, and means selectively permitting the tine means to pass through said substantially vertical plane in the other direction.

4. An animal feeder, comprising: support means, a feed trough movably supported on said support means and adapted to receive feed from a source, means for moving said trough between first and second positions, first sweep means pivotally mounted on said support means and positioned to extend within said trough when the trough is in the first position, second sweep means pivotally mounted on said support means and positioned to extend within said trough when the trough is in the second position, said first sweep means being constructed to sweep feed from the trough as the trough moves from the first position toward the second position and the second sweep means being constructed to sweep feed from the trough as the trough means moves from the second position toward the first position, first tine means pivotally mounted adjacent said first sweep means for assisting in feed discharge from the trough, second tine means adjacent said second sweep means for assisting in feed discharge from the trough, means permitting said tine means to pass freely through a vertical plane, said sweep means being of sufficient length to engage the trough, and means interconnecting said sweep means and the associated tine means so that the tine means may not pass freely through said vertical plane when the trough is under the sweep means.

5. An animal feeder as defined in claim 4, including means limiting the maximum relative movement of said sweep means with respect to said tine means to an acute angle so that the tine means remains in an operative position when the trough is thereunder, said sweep means and the associated tine means being free to pivot through said vertical plane when the trough is not thereunder.

6. An animal feeder as defined in claim 4, wherein each of the sweep means and the adjacent tine means are mounted for free rotation on the same pivotal axis, said sweep means having abutment means thereon engageable with said adjacent tine means to limit the maximum angle therebetween.

7. An animal feeder as defined in claim 4, wherein said tine means is sufficiently short to clear the trough when thereunder, said tine means being pivotally mounted for free rotation through said generally vertical plane, said means interconnecting said sweep means and the associated tine means to prevent free movement of said tine means through a generally vertical plane also being constructed to maintain the tine means in an active position when the trough is under the sweep means.

8. An animal feeder, comprising: support means, a feed trough movably supported on said support means and adapted to receive feed from a source, means for moving said trough between first and second positions, first sweep means pivotally mounted on said support means and positioned to extend within said trough when the trough is in the first position, second sweep means pivotally mounted on said support means and positioned to extend within said trough when the trough is in the second position, said first sweep means being constructed to sweep feed from the trough as the trough moves from the first position toward the second position and the second sweep means being constructed to sweep feed from the trough as the trough means moves from the second position toward the first position, first tine means pivotally mounted adjacent said first sweep means for assisting in feed discharge from the trough, second tine means adjacent said second sweep means for assisting in feed discharge from the trough, said sweep means being of sufficient length to engage said trough when the latter is thereunder, and interengaging means on the sweep means and the tine means limiting the maximum relative movement therebetween so that the tine means when engaging feed assist in pulling the associated sweep means downwardly.

9. In a sweep shuttle animal feeder which has a supporting frame and track means, a feed bunk beneath said track means, a feed trough which is approximately half the length of said feed bunk reciprocable on said track means, said trough having a floor, a feed supply station above the mid-point of the feed bunk to deposit feed in the trough as the latter reciprocates, means for selectively moving deposited feed relative to the trough floor including a plurality of sweep means at each side of the feed supply station and mounted for swinging movement on a transverse axis which is a predetermined distance above the trough floor, said sweep means being so related to the trough that as the latter moves along the feed bunk the sweep means positioned at the side of the feed supply station being traversed by the leading end of the trough pass over the feed in the trough while the sweep means positioned at the side of the feed supply station being traversed by the trailing end of the trough arrest feed in the trough so that it drops off said trailing end, each of said sweep means including a sweep panel member which is longer than the distance from the axis to the floor, a plurality of sweep tine means on each side of said supply station, there being provided at least one sweep tine means for each sweep means, each of said sweep tine means being freely pivoted about said axis through a vertical plane, said sweep tine means being mounted for relative movement with respect to said sweep means up to a maximum which is less than ninety degrees, said tine means being adapted to dig into feed material which the panel member tends to ride over, the sweep panel as it passes over the trailing end of the trough permitting the tine means to swing through said vertical plane and upwardly and over the feed material at the end of the trough so that the feed material does not become squeezed between the sweep means and the tine means.

10. In a sweep shuttle animal feeder as defined in claim 9, including a plurality of shafts for supporting said sweep means and said tine means for rotation, each of said means including at least two channel members fixed to an associated panel member, each of said channel members having a web portion that terminates adjacent said shaft defining an abutment, each of said tine means including a tine supported on said shaft with said channel member and engageable with said abutment to define the maximum permitted angle between the sweep means and the tine means.

References Cited

UNITED STATES PATENTS

| 3,366,223 | 1/1968 | Haen | 119—56 |
| 3,419,130 | 12/1968 | Ferris | 119—52 |
| 3,443,547 | 5/1969 | Ferris | 119—52 |

RICHARD E. AEGERTER, Primary Examiner

U.S. Cl. X.R.

198—67, 218